INVENTOR.
GUY M. BAUDELET de LIVOIS

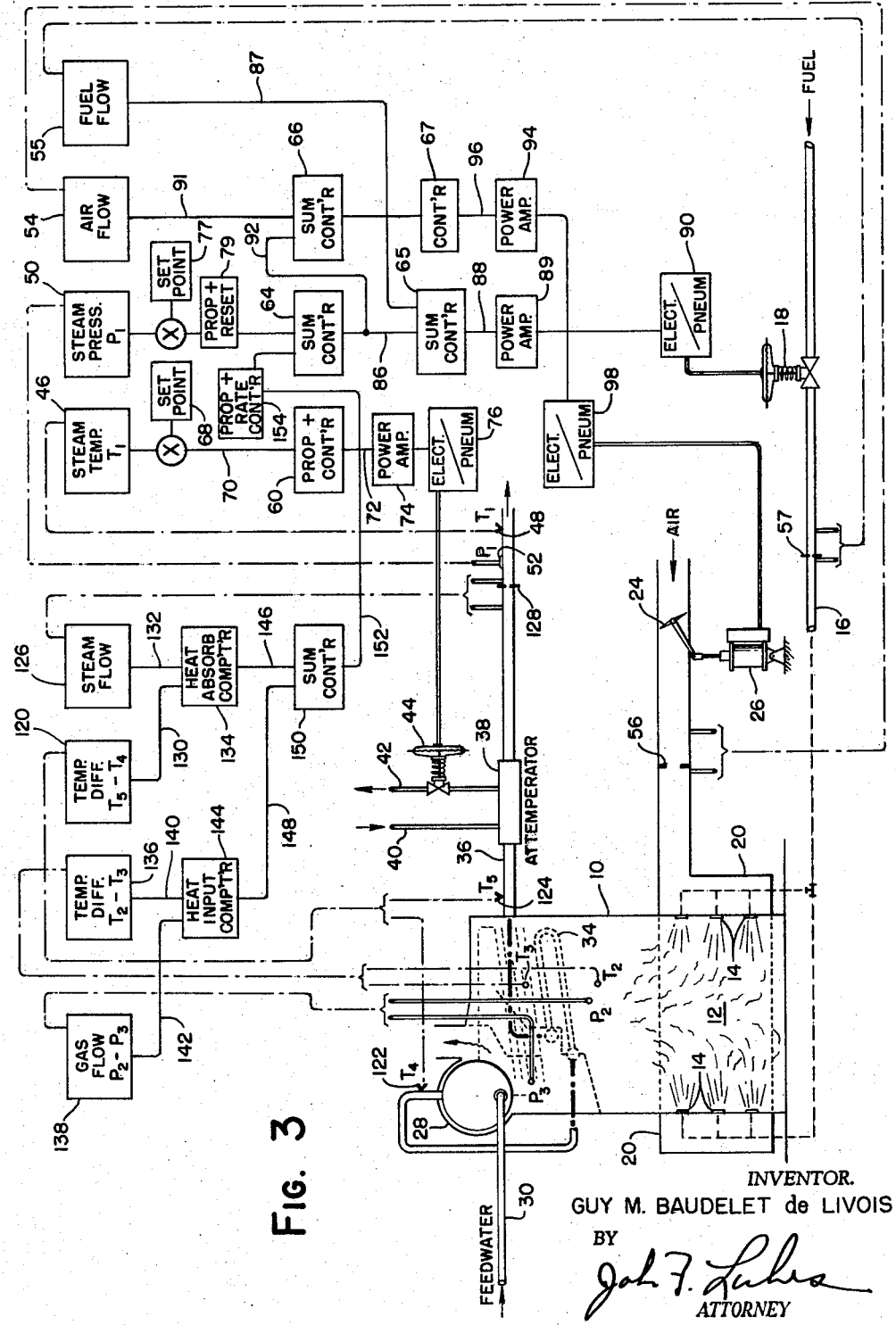

United States Patent Office

3,183,897
Patented May 18, 1965

3,183,897
SUPERHEAT CONTROL
Guy M. Baudelet de Livois, Paris, France, assignor to Societe dite Controle Bailey, Paris, France, a company of France
Filed Nov. 13, 1961, Ser. No. 151,939
Claims priority, application France, Feb. 13, 1961, 852,585
10 Claims. (Cl. 122—479)

This invention relates to temperature control apparatus and more particularly to apparatus for controlling the final temperature of superheated vapor in a vapor generating system.

At the high generation pressures and temperatures of modern steam and other vapor generating units, temperature variations of the final superheated vapor have become more serious in effect. In many instances such as in the case of a steam boiler materials employed in the boiler and steam operated turbines are incapable of withstanding the additional stresses caused by temperature variations and particularly the temporary stresses created during rapid fluctuations in temperature. As a result, accurate temperature control has become a necessity.

In most commercial steam generating units utilizing controlled combustion of fuel and air as a source of heat input, the fuel and air supplies are regulated from an index of demand such as steam pressure and/or steam flow. To control the temperature of the superheated steam a separate control system is usually provided which functions independently of the combustion control to regulate the final steam temperature. The more common methods of independently controlling the final steam temperature include superheater by-passing, recirculation of flue gas, water injection or spray attemperation as it is usually called, tilting of the fuel burners, and attemperation. With all of these methods it has been customary to utilize the final steam temperature as a control index to operate the tempering device to maintain a constant steam temperature.

The temperature regulation achieved through application of the above methods has been to some extent satisfactory but falls short of optimum performance and in many instances increases the heat loss in the system reducing the overall economy of operation. Also, the high heat storage capacity of the superheat system augments the regulation problem and the inefficiencies of the temperature control.

It is a principal object of the invention to provide an improved vapor temperature control for a vapor generating apparatus capable of providing optimum temperature regulation.

Another object of the invention is to modify the heat input to a vapor generator in accordance with variations in final vapor temperature.

Another object of the invention is to modify the heat input to a vapor generator in accordance with a signal representative of the rate of change of the final vapor temperature.

Another object of the invention is to anticipate changes in final vapor temperature in a vapor generating apparatus and to modify the heat input to the apparatus accordingly.

Still another object of the invention is to provide an anticipatory control operative to modify the heat input to a vapor generator to balance the heat absorbed by a superheater with the heat input to regulate the temperature of the superheated vapor.

Other objects and advantages will become apparent from the following description taken in connection with the accompanying drawings wherein:

FIG. 3 is an illustration similar to FIGS. 1 and 2 showing still another embodiment of the invention.

Figure 1:
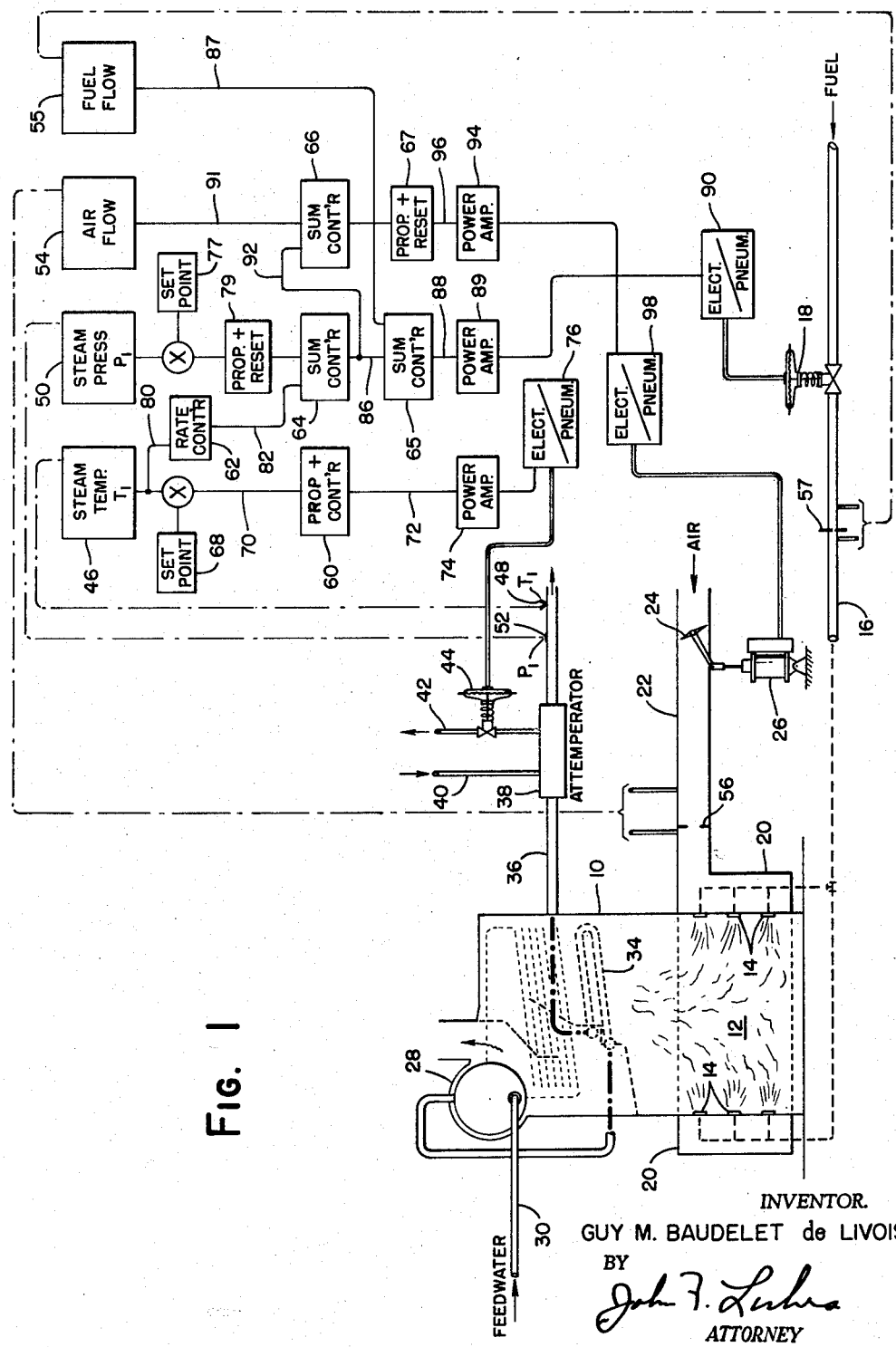
FIG. 1 is a schematic illustration of a vapor generating unit and a control system therefor embodying the invention.

Referring to FIG. 1 of the drawings, there is shown a vapor generating unit 10 of the sub-critical pressure type. For purposes of simplicity, the boiler 10 is shown schematically as comprising a forced air fluid fuel fired unit having a combustion chamber 12 and vertically spaced burners 14 on opposite walls thereof. Fuel is supplied to the burners 14 by a main fuel supply pipe 16, the flow through which is regulated by a pneumatically operated fuel control valve 18. Windboxes 20 on opposite walls of the combustion chamber 12 provide combustion air and are connected to a main air duct 22 through which air may be supplied by a fan (not shown). An air damper 24 actuated by pneumatic drive 26 determines the rate of air flow to the windboxes 20.

The generator 10 is representative of a natural circulation boiler having a drum 28 and a superheater 34. Superheated steam is discharged from the superheater 34 through a header 36 to a point of usage (not shown). An attemperator 38 is associated with the steam header 36 and operates in a manner well known to those skilled in the art as a temperature control means to vary the temperature of the final superheated steam by indirectly cooling the same. The attemperator 38 is illustrated as provided with a water supply pipe 40 and a water discharge pipe 42. A pneumatically operated valve 44 in the discharge pipe regulates the flow of water through the attemperator 38. As my invention is not concerned with a particular arrangement of vapor generator and superheater I have purposely shown a simplified arrangement which should be taken as representative of the various types presently employed and which are well known to those skilled in the art. Similarly I have shown an elementary form of attemperator and control therefor as symbolic of one of the usual arrangements for controlling superheat such as flue gas recirculation, superheater by-passing, tilting burners and the like.

In operation the fuel valve 18 and air damper 24 are actuated in accordance with variations in demand for superheated steam to produce controlled combustion of fuel and air in chamber 12. Heat is transferred partially by radiation and partially by convection from the hot conduction gases to the superheater 34 causing superheating of the steam. Attemperator 38 is operative as will later be described in combination with other controls to remove heat as necessary from the superheated steam in header 36 to produce a regulated superheat steam temperature.

As previously mentioned and as I wish to emphasize for the purpose of simplicity only a sub-critical pressure boiler in its simplest form has been illustrated. It will be apparent to those skilled in the art, however, that the boiler 10 may take various forms of construction and utilize various methods of operation and firing. Thus, in actual construction the boiler 10 may differ substantially from the basic unit schematically illustrated and possess considerable complexity. It will also be apparent that suitable feedwater controls and other controls (not shown) necessary for proper boiler operation have been omitted in furtherance of simplicity.

Referring now to the instrumentation and control system for the boiler 10, the variables fuel flow rate, air flow rate, final steam temperature and final steam pressure are utilized as control indexes to control actuation of valves 18 and 44 and damper drive 26. More particularly, an electric transmitting device 46 is responsive to the steam temperture $T_1$ in header 36 as sensed by a thermocouple or other suitable temperature measuring element 48 and is operative to establish an electrical output signal representative of the instantaneous temperature. A transmitting device 50 is responsive to the steam pressure $P_1$ in header 36 as sensed by a suitable pressure measuring element 52 and is operative to establish an electrical signal representative of the instantaneous steam pressure. Similarly, transmitting devices 54 and 55 are responsive to the rate of air flow in conduit 22 and the rate of fuel flow in pipe 16 as sensed by primary flow measuring elements 56 and 57 respectively to establish electrical signals representative of the instantaneous air flow rate and instantaneous fuel flow rate. Transmitting devices 46, 50, 54 and 55 and primary measuring elements 48, 52, 56 and 57 may take various commercially available forms well known to those skilled in the art operative to establish an electrical output signal representative of the magnitude of a measured variable.

The control system as shown schematically utilizes five electric controllers 60, 62, 64, 65 and 66. Each controller includes an operational amplifier circuit (not shown) having passive input and feedback impedances which may be selectively arranged to induce desired control actions such as proportional, rate and reset action into the controller output signal. Additionally, the controller may be provided with a plurality of inputs for algebraically adding several input signals to form a summing controller. The controller 60 is illustrated as a single input proportional plus reset action controller while controller 62 is preferably a pure rate action controller. Controller 64, 65 and 66 are proportional action summing controllers with two inputs. As will be apparent to those skilled in the art, controllers 60, 62, 64, 65 and 66 may additionally incorporate other desired actions depending on the particular characteristics of the vapor generating system; or additional controllers may be provided to introduce such control actions.

The output of transmitting device 46 is illustrated schematically as being compared with a set point signal established by a manually adjustable device 68, the difference or error signal being applied to the input of controller 60 by a conductor 70. The output of controller 60 is connected by a conductor 72 to the input of a power amplifier 74 of conventional circuitry. The output of amplifier 74 is converted to a pneumatic signal in an electrical to pneumatic converter 76, the output signal pressure of the latter being applied to pneumatically operative valve 44.

The output signal of transmitting device 50 is similarly compared with a set point signal established by a device 77, and the difference or error signal is applied to a proportional plus reset controller 79, the output of which is applied to one input of summing controller 64. The output of transmitting device 46 is additionally supplied to the input of rate controller 62 by a conductor 80, the output of which is transmitted by conductor 82 to the second input of controller 64 to be algebraically combined with the signal from controller 79. Thus, as will later be described in more detail the output of summing controller 64 is proportional to the algebraic sum of a signal representative of the deviation of steam pressure from set point and a signal representative of the rate of change of the steam temperature $T_1$, the latter signal being zero when the temperature is constant.

The output of summing controller 64 is applied by a conductor 86 to one input of controller 65, the output of transmitting device 55 being applied to the other input by a conductor 87. The signal representative of the deviation of steam pressure from set point as modified by the rate of temperature change signal is thus compared with a signal representative of actual fuel flow in controller 65 to establish a difference or control signal. The output of summing controller 65 is applied by a conductor 88 to the input of a power amplifier 89, the output of which is converted to a pneumatic signal in an electric to pneumatic converter 90 and applied to valve 18 to position the same.

The output signal of transmitting device 54 is connected by conductor 91 to one input of the summing controller 66, the other input of which is connected to the output of summing controller 64 by a conductor 92. With this arrangement the output of summing controller 66 will be proportional to the algebraic sum of the steam pressure signal as modified by the output of rate controller 62 in summing controller 64, and the air flow signal. In effect the modified steam pressure signal which establishes the rate of fuel supply also establishes a set point signal for the air flow control.

The output of summing controller 66 is applied to the input of a proportional plus reset controller 67 the output of which is applied to a power amplifier 94 by a conductor 96. The output of power amplifier 94 is transmitted to an electric to pneumatic converter 98 which converts the output of amplifier 94 to a pneumatic signal which is applied to the damper drive 26 to effect positioning of the damper 24.

In operation of the system illustrated in FIG. 1 assume first that the steam temperature as sensed by measuring element 48 is constant at set point. At this condition the output of controller 62 will be zero and the control system will function to maintain a constant steam pressure in header 36 by regulating the firing rate and heat input to the boiler 10. For example, if during the constant steam temperature condition the steam pressure should decrease as a result of an increase in demand for steam, the output of transmitting device 50 will vary to produce an input signal to controller 64. The resulting output of controller 64 is compared with the output signal of transmitting device 55 representative of the actual fuel flow rate in controller 65. The output of controller 65 proportional to the signal difference is effective to reposition the valve 18 to effect an increase in fuel flow. In controller 66 the output of controller 64 is similarly compared with the output signal of transmitting device 54 representative of actual air flow, and the output of controller 66 through the proportional plus reset controller 67 is effective to reposition the damper 24 to increase the air flow rate in proportion to the increased fuel flow to thus continuously match air flow with fuel flow. Thus, the system during a constant steam temperature condition continuously adjusts the fuel and air supplies to maintain a constant steam pressure condition.

Assume now a constant demand and steam pressure condition and a varying steam temperature condition. If the steam temperature should depart from set point temperature, the output of transmitting device 46 will change accordingly to produce an input to controller 60. As a result valve 44 will be positioned to change the effectiveness of attemperator 38 to vary the steam temperature. Simultaneously the rate action controller 62 is responsive to the changing output of transmitter 46 in response to the temperature change to produce an input to controller 64 proportional to the rate of change of the steam temperature. This rate signal applied to the input of controller 64 results in a variation in the firing and air flow rates to vary the heat input to the superheater section 34.

During a rapid fluctuation in steam temperature a substantial change in firing and air flow rates will occur through operation of rate controller 62 while during a slower change in temperature only a slight variation will occur. In either case when the temperature fluctuation ceases the output of rate action controller is reduced to zero and has no effect on the normal determination of firing and air flow rates from demand on steam pressure.

It will also be apparent that once the steam temperature commences to return to set point as the result of a variation in the effectiveness of the attemperator 38 and a variation in the firing rate, the rate action controller 62 also functions to vary the firing and air flow rates according to the rate of change of return of the temperature to set point to prevent overshoot beyond the set point temperature.

The advantages of the control system illustrated in

FIG. 1 will now be apparent. During extremely slow changes in steam temperature the rate action controller 62 has a small and negligible effect on the steam pressure or demand control and the effectiveness of the attemperator 38 is varied in a conventional manner from an index of steam temperature. When a rapid change in temperature occurs, which due to the high heat storage capacity of the superheater section 34 cannot be immediately corrected by variation in the effectiveness of attemperator 38, the rate action controller 62 becomes effective to modify the firing rate and heat input to superheater section 34 in proportion to the rate of change to reduce the temperature variation to a minimum. The system accordingly functions to anticipate substantial variations in temperature before occurrence thereof by modifying the heat input to the superheater section 34.

The effect of rate action controller 62 on the firing rate normally determined solely from demand is only temporary in nature and thus has a negligible effect on the steam pressure. More particularly, while the superheater section 34 has a high heat storage capacity the usual vaporizer section of the generator 10 has a much higher storage capacity, and the temporary modification of the firing rate during a changing steam temperature condition will have a substantial effect on the steam temperature but only a slight effect if any on steam pressure. The firing rate is still basically controlled from the primary demand index with the rate action controller 62 functioning only to introduce temporary anticipatory variations in the firing rate to assist in the maintaining of a constant steam temperature. Even during widely fluctuating steam pressure conditions such as may be caused by a widely varying load the steam pressure index is the dominant factor in controlling firing rate and any periodic readjustments of the firing rate caused by operation of controller 62 have a negligible effect on the proper functioning of the steam pressure control.

Figure 2:
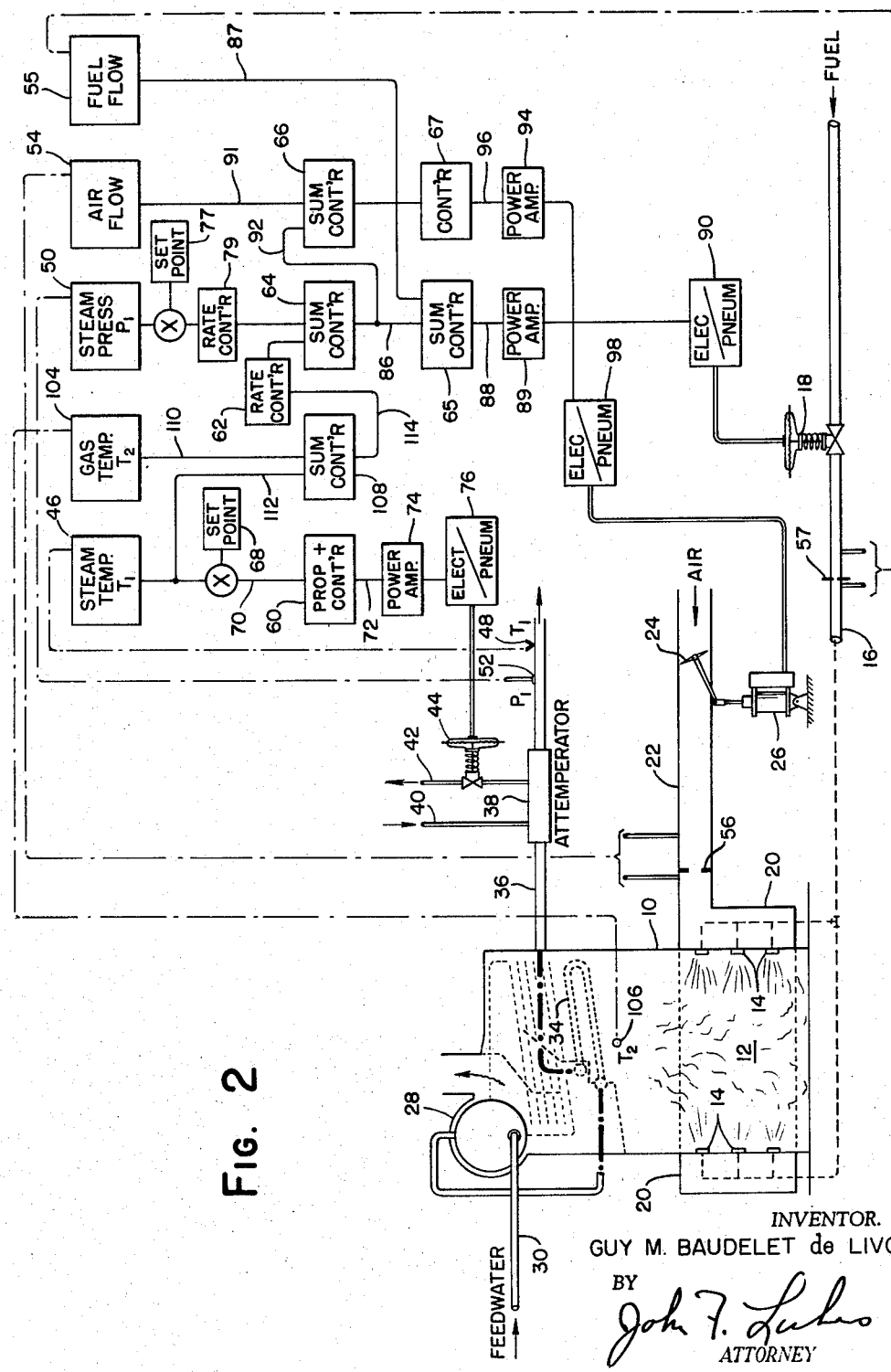
FIG. 2 is a schematic illustration similar to FIG. 1 showing another embodiment of the invention.

Referring now to the embodiment of FIG. 2 wherein similar parts have been given like reference numerals there is shown an alternate control scheme for the boiler 10. In this embodiment an additional transmitting device 104 is provided which is responsive to the temperature $T_2$ of the combustion gas entering the region of the superheater section 34 as sensed by a thermocouple or other suitable primary measuring element 106. An additional summing controller 108 having two inputs is provided, the output of transmitting device 104 being connected to one input by a conductor 110 and the output of transmitter 46 being connected to the second input by conductor 112. The output of controller 108 is connected by conductor 114 to the input of rate action controller 62.

In operation of the embodiment of FIG. 2 the transmitting device 104 functions to produce an electric signal which is representative of the temperature $T_2$ of the combustion gases supplied to the superheater section 34. Since the available heat in the gas supplied to the superheater section 34 is equal to the mass flow rate multiplied by the gas temperature which in this case is temperature $T_2$, the output of transmitter 104 provides some indication of the available heat and anticipates a variation in temperature of the steam temperature $T_1$ as a result of variation in the available heat caused by variation in gas temperature. The transmitter 104 thus establishes a tendency signal which will vary in advance of the steam temperature.

The output tendency signal of transmitting device 104 is compared with the actual steam temperature in controller 108 which establishes an input to rate action controller 62 proportional to the signal difference. With this arrangement the input to rate action controller 62 will vary in response to variation in either steam temperature or gas temperature or both and the rate action controller 62 functions to produce an input to controller 64 proportional to the rate of change of the signal difference.

Similar to the system of FIG. 1 the correction to the firing rate produced by rate action controller 62 is only temporary in nature and occurs only during a changing steam temperature condition or changing gas temperature condition. Since the magnitude of the temporary correction in the system of FIG. 2 is also dependent on a rate of variation the resultant effect is a temporary anticipatory control which assists the attemperator 38 in maintaining a constant steam temperature condition without affecting normal operation of the steam pressure control over firing rate and heat input.

Referring now to FIG. 3 there is shown still another embodiment of the invention which utilizes additional control indexes for achieving even more accurate control over steam temperature. More particularly, the system of FIG. 3 utilizes a transmitting device 120 which establishes an electric signal proportional to the temperature difference of the temperature $T_4$ of the steam entering the superheater section 34 and the temperature $T_5$ of the steam in header 36 as sensed by primary measuring elements 122 and 124 respectively. A transmitting device 126 is operative to establish an electric signal proportional to the steam flow in header 36 as sensed by suitable primary measuring element 128. The outputs of transmitting devices 120, 126 are connected by conductors 130 and 132 respectively to a computing device 134 which is capable of establishing an electrical output signal proportional to the product of two input signals. The output of transmitting device 126 is indicative of the weight of steam flowing through superheater section 34. The computing device 134 is effective to multiply this signal with the temperature difference signal established by transmitting device 120 to thus establish an electric output signal proportional to the heat absorbed by the superheater section 34.

A computation of heat input to the superheater section 34 is also achieved for comparison with the heat absorbed. Transmitting device 136 is effective to establish an electric signal proportional to the temperature difference of the gas temperature $T_2$ entering the superheater section 34 and the temperature $T_3$ of the gas leaving the superheater section 34. A transmitting device 138 responsive to the difference in pressure of the gas entering the superheater section 34 ($P_2$) and the pressure ($P_3$) of the gas leaving the superheater section 34 establishes an electric signal representative of the mass flow rate of combustion gases through the superheater section 34. The outputs of transmitting devices 136 and 138 are connected by conductors 140 and 142 respectively to a heat input computer 144 which functions similar to computer 134 to multiply the two input signals and establish an output signal proportional to the product which in this case is representative of heat input to the superheater section 34.

The two signals representative of heat input and heat absorbed with respect to superheater section 34 are applied by conductors 146 and 148 respectively to the inputs of a summing controller 150, which establishes an output signal proportional to the difference of the two input signals. The output of controller 150 is connected by conductor 152 to the input of a controller 154 having proportional plus rate action. The output of the controller 154 is connected to one input of summing controller 64, the other input of which is connected to controller 79 as in the embodiments of FIGS. 1 and 2. With this arrangement the output of controller 154 will be proportional to the difference of the signals representative of heat input and heat absorbed and will have a rate component proportional to the rate of change of the signal difference.

In the embodiment of FIG. 3 the steam temperature $T_1$ output signal of transmitting device 46 is only utilized to operate attemperator 38, the indexes of heat absorbed by and heat input to the attemperator 34 in this case being utilized to provide anticipation of a change in steam temperature to modify the steam pressure control over firing rate.

In operation of the embodiment of FIG. 3 when the heat input to superheater section 34 as determined by computing device 144 equals the heat absorbed as determined by computing device 134 the superheater section 34 is in heat balance. A difference in these two quantities, however, signifies an out of balance condition which is likely to be reflected in a change in steam temperature. Thus, the signal difference and the output of controller 154 provides an anticipatory index of variations in final steam temperature.

When the output signals of computing devices 134 and 144 are equal or stand in predetermined relation the signal difference and the outputs of controllers 150 and 154 will be zero. At this condition the firing rate is controlled solely from the primary index of steam pressure and the attemperator 38 is controlled exclusively from steam temperature.

If a signal difference should occur between the outputs of devices 134 and 144 indicating an unbalance between heat input and heat absorbed with respect to superheat section 34, the controller 154 will produce an output signal having a proportional component of polarity and magnitude dependent on the direction and magnitude of unbalance and a rate component proportional to the rate of change of the unbalance condition. As a result the output of controller 64 will vary to vary the firing rate of the boiler 10 in a direction tending to restore the heat balance. When equilibrium is restored, the output of controller 154 will be zero and the firing rate will be controlled solely from steam pressure.

In the system of FIG. 3 it has also been found that the temporary modification of the firing rate to assist the attemperator 38 in regulating steam temperature has a negligible effect on the steam pressure due to the much higher heat storage capacity of the vaporizer section of generator 10. Thus, the system functions to accurately control steam temperature and steam pressure.

*Summary*

The disclosed control systems each function to maintain a constant steam temperature condition by anticipating in various manners a change in steam temperature and temporarily modifying the boiler firing rate to vary the available heat to the superheater section 34. In the system of FIG. 1 this is accomplished by establishing a signal representative of the rate of steam temperature change to modify the firing rate proportional to the magnitude of the anticipatory signal. In FIG. 2 signals representative of steam temperature and gas temperature at the superheater inlet are compared and a correction to the firing rate is effected proportional to the rate of change of either. In the system of FIG. 3 both the heat input and heat absorbed with respect to the superheater section are computed and the difference or unbalance condition being utilized to effect a proportional plus rate variation in the firing rate until equilibrium is achieved.

While several embodiments of the invention have been herein shown and described it will be apparent to those skilled in the art that many changes may be made in the construction and arrangement of parts and function thereof without departing from the scope of the invention as defined in the appended claims.

What I claim and desire to secure by Letters Patent of the United States is:

1. In a control system for a vapor generating apparatus having a firing means with a controllable fuel supply, a vaporizer for converting liquid to saturated vapor under the influence of the heat input, and a superheater for superheating the vapor under the influence of the heat input, the combination comprising, means responsive to the pressure of the superheated vapor for controlling the fuel supply, means for varying the temperature of the superheated vapor independently of the heat input, means responsive to the temperature of the superheated vapor for controlling said temperature varying means to maintain a relatively constant superheated vapor temperature, means for anticipating a variation in temperature of the superheated vapor and for establishing a signal representative of the variation tendency and the extent of variation, and means responsive to said signal for modifying the rate of fuel supply to the vapor generating apparatus in anticipation of a temperature variation to counteract the same and assist said temperature varying means in maintaining a relatively constant superheated vapor temperature.

2. In a control system for a vapor generating apparatus having a firing means with a controllable fuel supply, a vaporizer for converting liquid to saturated vapor under the influence of the heat input, and a superheater for superheating the vapor under the influence of the heat input, the combination comprising, means responsive to the pressure of the superheated vapor for controlling the fuel supply, means for varying the temperature of the superheated vapor, means for establishing a first signal representative of the magnitude of the superheated vapor temperature relative to a predetermined set point temperature, means responsive to said first signal for operating said temperature varying means to maintain said set point temperature, means for establishing a second signal proportional to the rate of variation of the superheated vapor temperature, and means responsive to said second signal for modifying the rate of fuel supply in a direction tending to maintain the superheated vapor temperature at the said set point temperature.

3. In a control system for a vapor generating apparatus utilizing controlled combustion of fuel as a source of heat input and having a vaporizer subjected to the hot combustion gas flow for converting liquid to saturated vapor and a superheater subjected to the hot combustion gas flow for superheating the saturated vapor, the combination comprising, means responsive to the pressure of the superheated vapor generated by the apparatus for establishing a first signal representative of the demand, means responsive to the temperature of the superheated vapor for establishing a second signal representative of the temperature of the superheated vapor, means responsive to the temperature of the combustion gas supplied to the superheater for establishing a third signal representative of the gas temperature, means responsive to said first signal for regulating the combustion rate to control the rate of vapor generation, and means conjointly responsive to said second and third signals producing a fourth signal proportional to the sum of said second and third signals, means producing a fifth signal proportional to the rate of change of said fourth signal and means under the control of said fifth signal for adjusting the combustion rate to regulate the temperature of the superheated vapor.

4. In a control system for a vapor generating apparatus utilizing combustion of fuel as a source of heat and having a vaporizer subjected to the hot combustion gas flow for converting liquid to a saturated vapor and a superheater subjected to the hot combustion gas flow for superheating the saturated vapor, the combination comprising, means responsive to the pressure of the superheated vapor generated by the apparatus for establishing a first signal, means responsive to the temperature of the superheated steam for establishing a second signal representative of the temperature of the superheated vapor, means responsive to the temperature of the combustion gas supplied to the superheater for establishing a third signal representative thereof, means for comparing said second and third signals to establish a fourth signal related to the difference thereof, means responsive to said first signal for controlling the combustion rate in accordance with demand for superheated vapor, and means responsive to said fourth signal for modifying the combustion rate determined by said first signal responsive means to regulate the temperature of the superheated vapor.

5. In a control system as claimed in claim 4 wherein means are provided responsive to variations in said second signal for regulating the temperature of the superheated vapor independently of the heat input, said fourth signal responsive means being operative to anticipate variations in temperature to vary the combustion rate and the heat input to the superheater to assist said second signal responsive means.

6. In a control system as claimed in claim 5 wherein said fourth signal responsive means includes a rate sensitive device to render said fourth signal responsive means responsive only to the rate of variation of said fourth signal.

7. In a control system as claimed in claim 6 wherein said demand responsive means is responsive to the pressure of the superheated vapor, said first signal being representative of variation in said pressure from a predetermined set point pessure.

8. In a control system for a vapor generating apparatus having a firing means with a controlled fuel supply, a vaporizer section subjected to the combustion gas flow for converting liquid to a saturated vapor and a superheater section subjected to the combustion gas flow for superheating the saturated vapor, the combination comprising, means responsive to the pressure of the superheated vapor for establishing a signal representative thereof, means responsive to the gas temperature difference across the superheater section and the gas flow rate for establishing a second signal representative of the heat input to the superheater, means for establishing a third signal representative of the heat absorbed by the superheater section, means responsive to said first signal for regulating the fuel supply to produce a vapor generation rate corresponding to the demand, an attemperator means for varying the temperature of the superheated vapor independently of the heat input, means responsive to the temperature of the superheated vapor for controlling said attemperator to maintain a relatively constant superheated vapor temperature, means for comparing said second and third signals to establish a fourth signal representative of the heat balance of the superheater section, and means responsive to said fourth signal for modifying the combustion rate as established by said first means during heat unbalance to restore balance.

9. In a control system for a vapor generating apparatus having a firing means with a controlled fuel supply, a vaporizer section subjected to combustion gas flow for converting liquid to a saturated vapor and a superheater section subjected to the combustion gas flow for superheating the saturated vapor, the combination comprising, means responsive to the pressure of the superheated vapor for establishing a signal representative thereof, means responsive to the gas temperature difference across the superheater section, means responsive to the gas flow rate through the superheater section, means connected to said gas flow and temperature responsive means for computing the heat input to the superheater and establishing a second signal representative thereof, means responsive to the vapor temperature difference across the superheater section, means responsive to the steam flow from said vapor generator, means connected to said vapor temperature and steam flow responsive means for computing the heat absorbed by the superheater section and establishing a third signal representative thereof, means responsive to said first signal for regulating the fuel supply to produce a vapor generation rate corresponding to the demand, an attemperator for varying the temperature of the superheated vapor independently of the heat input, means responsive to the temperature of the superheated vapor for controlling said attemperator to maintain a relatively constant superheated temperature, means for comparing said second and third signals to establish a fourth signal representative of the heat balance of the superheater section, and means responsive to said fourth signal for modifying the fuel supplied as established by said first means during heat unbalance to restore balance.

10. In a control system as claimed in claim 9 wherein said fourth signal responsive means includes a rate sensitive device to render said fourth signal proportional to both the signal difference and the rate of variation of the signal difference.

References Cited by the Examiner

UNITED STATES PATENTS

| 1,975,086 | 10/34 | Dickey | 122—451 |
| 2,840,054 | 6/58 | Rowand | 122—479 |
| 2,926,636 | 3/60 | Paulison | 122—479 |
| 2,976,858 | 3/61 | Chan | 122—479 |
| 2,984,984 | 5/61 | Dickey | 122—479 |
| 2,985,151 | 5/61 | Dickey | 122—479 |
| 3,028,844 | 4/62 | Durham et al. | 122—479 |
| 3,040,719 | 6/62 | Dickey | 122—479 |

FOREIGN PATENTS 728,838    4/55    Great Britain.

ROBERT A. O'LEARY, *Primary Examiner.*

PERCY L. PATRICK, *Examiner.*